United States Patent Office 3,444,136
Patented May 13, 1969

3,444,136
PROCESS FOR THE PREPARATION OF
POLYQUINAZOLONES
Leo R. Belohlav, Berkeley Heights, and John R. Costanza, North Plainfield, N.J., assignors to Celanese Corporation, New York, N.Y., a corporation of Delaware
No Drawing. Filed Nov. 1, 1967, Ser. No. 679,669
Int. Cl. C08g 20/32
U.S. Cl. 260—47     9 Claims

ABSTRACT OF THE DISCLOSURE

Polyquinazolones which may be shaped to form fibers, films and other shaped articles are prepared by reacting a diacylated aromatic diaminodicarboxylic acid such as a dicylated bisanthranilic acid with a diprimary diamine such as 4,4'-diaminodiphenylether.

BACKGROUND OF THE INVENTION

The present invention relates to a process for the preparation of condensation polymers, and more particularly, to a process for the preparation of linear polyquinazolones.

Since their discovery, linear condensation polymers such as the polyamides and polyesters have found wide application in the plastic industry in the form of fibers, films and molded articles. The polyamides described in Wallace H. Carothers' U.S. Patents 2,071,250 and 2,071,-253, issued Feb. 16, 1937, and U.S. Patent 2,130,948, issued Sept. 20, 1938, for example, are tough, wear resistant, resilient, stable polymers, useful over a wide range of conditions. However, the search for improved polymers having higher stiffness and toughness, higher softening points, better retention of stiffness at elevated temperatures, improved resistance to water and oxygen, has continued. The present invention was made as the result of the search for such improved polymers.

SUMMARY OF THE INVENTION

Accordingly, the primary object of the present invention is to provide a process for the preparation of polyquinazolones. This and other objects will be apparent from the following description.

In accordance with the present invention, polyquinazolones are prepared by reacting a diacylated aromatic diaminodicarboxylic acid, wherein each carboxy group has a vicinal acylated amino group, with a diprimary diamine.

The essence or heart of the present invention is the discovery that the diacylated aromatic diaminodicarboxylic acid does not have to be dehydrated in a separate step prior to reaction with the diamine, but that it can be dehydrated concurrently with its reaction with the diamine.

DETAILED DESCRIPTION OF THE INVENTION (A) Diacylated aromatic diaminodicarboxylic acid Any diacylated aromatic diaminodicarboxylic acid, sometimes hereinafter referred to simply as diacylated acid, having each carboxy group vicinal or ortho to an acylated amino group may be used in the present invention.

The diacylated acids are represented by the formula:

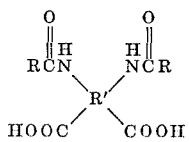

wherein R is aliphatic, cycloaliphatic or aromatic, preferably aromatic; and wherein R' is aromatic.

When R is an aliphatic group it is preferably one having from 1 to 10 carbon atoms, most preferably 1 to 3 carbon atoms; and when R is a cycloaliphatic group it is preferably one having from 5 to 8 carbon atoms. As mentioned above, R is preferably aromatic, for example, phenyl. The aliphatic, cycloaliphatic and aromatic groups may be substituted, provided the substituents do not interfere in the reaction with the diamine.

With reference to R', it may be a mono- or poly-nuclear aromatic group such as

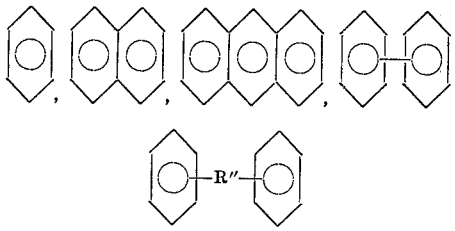

or wherein R'' is aliphatic, preferably containing from 1 to 6 carbon atoms; aromatic; —CO—; —SO$_2$—; —O—; —N—; or the like.

Preferably R' is monoaromatic or dimonoaromatic. The R' aromatic group may also contain inert substituents, i.e., substituents which do not interfere in the reaction of the diacylated acid with the diamine.

Suitable specific examples of the diacylated aromatic diaminodicarboxylic acids which may be used in the present invention are bis-(acylamino)-terephthalic acid; bis-(acylamino)-phthalic acid; bis-(acylamino)-isophthalic acid; bis-(acylamino)-diphenyl dicarboxylic acid; bis-(acylamino)-naphthalene dicarboxylic acid; and preferably, dibenzoyl-bisanthranilic acid (3,3'-dicarboxy dibenzoyl benzidine); 4,6-dibenzoylaminoisophthalic or 2,5-dibenzoylaminoterephthalic acid.

The diacylated aromatic diaminodicarboxylic acid may be conveniently prepared by diacylating the aromatic diaminodicarboxylic acid via any of the well known acylation processes. For example, the aromatic diaminodicarboxylic acid may be heated to a temperature of up to about 50° C. in the presence of an aqueous solution to which is added benzoyl chloride. The manner in which the diacylated acid is acylated or prepared does not form a part of the present invention.

(B) Diamine

The diamines which are reacted with the diacylated acids heretofore described are diprimary diamines, including hydrazine. The diprimary diamines may possess a general formula

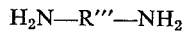

where R''' is aliphatic, aromatic, cycloaliphatic, —CO—, —SO$_2$— or a covalent bond.

Suitable aliphatic diprimary diamines possess a formula

where $n$ equals 2 to about 10. Illustrative examples of such aliphatic diprimary diamines include: 1,2-diaminoethane; 1,3-diaminopropane; 1,4-diaminobutane; 1,5-diaminopentane; and 1,6-diaminohexane (hexamethylene diamine).

Suitable aromatic diprimary diamines include: 1,2-diaminobenzene (ortho-phenylene diamine); 1,3-diaminobenzene (meta-phenylene diamine); 1,4-diamino-benzene (p-phenylene-diamine); 2,4-diaminotoluene; 2,6-diaminotoluene; 1,5 - diaminonaphthalene; 1,8 - diaminonaphthalene; 3,3'-dimethylbenzidine; tetramethyl-p-phenylenediamine; 4,4'-diaminodiphenylether and bis-(p-aminophenyl) methane.

Suitable cycloaliphatic diprimary diamines include: 1,4-cyclohexanediamine; and 4,4'-methylenebiscyclohexylamine.

The preferred diprimary diamines are aromatic and are represented by the formula $$H_2N-R'''-NH_2$$

wherein R''' is

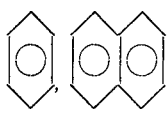

or

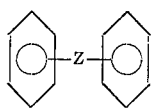

Z being a lower alkyl group having from 1 to 5 carbon atoms; oxygen; or a covalent bond. The aromatic ring(s) may also contain inert substituents such as lower alkyl groups having from 1 to 5 carbon atoms. Bis-(p-aminophenyl) methane and 4,4'-diaminodiphenylether are particularly preferred aromatic diprimary diamines.

The polyquinazolones of the present invention are formed by reacting equimolar quantities of one of the above described diacylated acids with one of the above described diamines, for example, by reacting equimolar quantities of diacylated bisanthranilic acid with 4,4'-diaminodiphenylether, as exemplified by the following reaction:

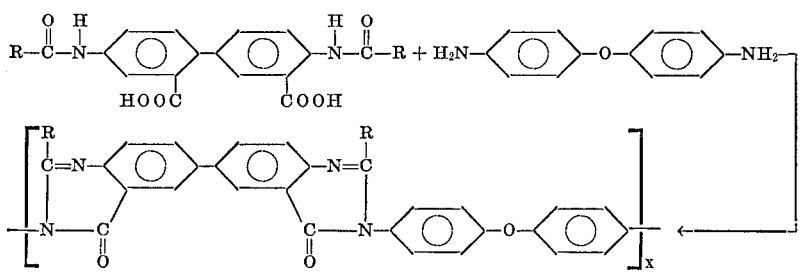

The reaction of the diacylated acid with the diamine is conducted at a temperature of above about 200° C., preferably from about 250° to 350° C.

The reaction is conducted in the presence of an inert atmosphere of nitrogen, argon or the like in order to prevent the oxidation of the diamine. Any convenient pressure may be used during the reaction, atmospheric or subatmospheric pressures being preferred in order to recover the water of condensation in its vapor state.

If desired, a dehydrating agent such as sodium sulfate may also be employed during the reaction in order to assist the condensation polymerization.

The diacylated acid may be reacted with the diamine in any conventional type of stirred, liquid-liquid, liquid-solid, or solid-solid reaction or polymerization zone, depending on the particular diacylated acid or diamine employed, on a continuous, semi-continuous or batch basis. Preferably, a mass or bulk polymerization reaction system is employed. However, if desired, the diacylated acid and diamine may be dissolved in a highly polar solvent such as dimethylacetamide, dimethylsulfoxide or hexamethylphosphoramide and subjected to solution polymerization.

Under the above mentioned conditions, the polymerization reaction of the diacylated acid with the diamine is normally completed in about 0.5 to 100 hours, preferably 3 to 10 hours.

The product polyquinazolone polymers formed by the process of the present invention are characterized by a high degree of stability, showing great resistance to treatment with hydrolytic and oxidizing media, and an ability to withstand continued exposure to elevated temperatures. The polymers may, for example, be dissolved in concentrated sulfuric acid and recovered without degradation by dilution with water. Solubility in concentrated sulfuric acid is not surprising for polymeric materials, but this medium normally rapidly degrades polymers.

Polyquinazolones prepared in accordance with this invention may be shaped to form fibers, films, and other shaped articles of wide utility. In the case of some of these polymers, melt temperatures are low enough that shaping may be accomplished directly from the melt. Where melt temperatures are too high for melt shaping, solutions may be prepared from which shaped articles may be formed. Many of the polymers are soluble in such solvents as formic acid, concentrated sulfuric acid, dimethyl sulfoxide and N,N-dimethyl-formamide, forming stable solutions which are especially well suited for the casting of films and the spinning of fibers. In the form of films and fibers, the polymers continue to exhibit their stability to high temperatures and their resistance to hydrolytic and oxidizing media, greatly enhancing their utility.

The invention is additionally illustrated by the following example.

EXAMPLE I

A stirred reaction vessel was charged with 15.9 grams of 3,3'-dicarboxybenzidine dissolved in 600 mls. of water and 12 mls. (14.1 grams) of benzoyl chloride. A solution of 12 grams of NaOH dissolved in 50 mls. of water was added slowly to the vessel with rapid stirring whereby the temperature rose to about 28° C. After about 15 minutes, acetic acid was added to the mixture causing the product dibenzoyl-bisanthranilic acid to precipitate out as a solid. The precipitate was recovered by filtration and washed with water. It was recrystallized from dimethylacetamide.

A stirred reaction vessel was charged with 2.4 grams of the above dibenzoyl-bisanthranilic acid and 1.0 gram of 4,4'-diamino diphenylether. The materials were reacted under a nitrogen atmosphere at a temperature of about 200 to 330° C. for about 7 hours to yield a polyquinazolone resin.

The resulting polyquinazolone resin had an inherent viscosity of 0.22 as measured in dimethylacetamide, and it was stable at 425° C. and 525° C. in $N_2$ and air, respectively.

The polyquinazolone obtained had the following elemental analysis.

*Analysis.*—Calculated: C, 78.9%; H, 3.97%; N, 9.21%. Found: C, 75.4%; H, 3.92%; N, 8.87%.

The principle, preferred embodiment, and mode of operation of the present invention have been described in the foregoing specification. However, it should be understood that the invention which is intended to be protected herein, may be practiced otherwise than as described without departing from the scope of the appended claims.

We claim:
1. A process for the preparation of polyquinazolones, which comprises heating at a temperature of above about

200° C. equimolar amounts of a diacylated aromatic diaminodicarboxylic acid of the formula

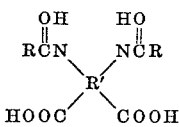

wherein R' is aromatic, R is selected from the class consisting of an aliphatic group, a cycloaliphatic group and an aromatic group, and wherein each carboxy group is vicinal to an acylated amino group with a diprimary diamine to yield the desired polyquinazolone.

2. The process of claim 1, wherein the diprimary diamine is of the formula $$H_2N—R'''—NH_2$$

wherein R''' is selected from the class consisting of a covalent bond, an aliphatic group, a cycloaliphatic group and an aromatic group, and the resulting polyquinazolone consists of recurring units of the formula

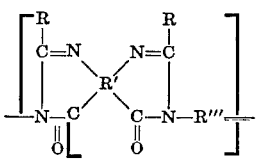

wherein R' is aromatic, R is selected from the class consisting of an aliphatic group, a cycloaliphatic group and an aromatic group, and wherein each carboxy group is vicinal to an acylated amino group with a diprimary di- 3. The process of claim 2, wherein R is aromatic.
4. The process of claim 3, wherein R' is aromatic and is selected from the class consisting of

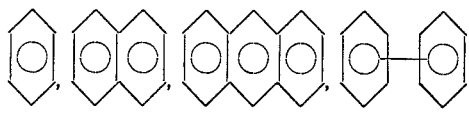

and 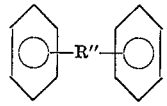

wherein R'' is selected from the class consisting of —CO—, —SO₂—, —O—, —N—, an aliphatic group, and an aromatic group.

5. A process for the preparation of polyquinazolones, which comprises reacting equimolar amounts of a diacylated aromatic diaminodicarboxylic acid of the formula

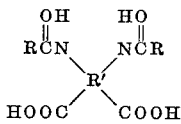

wherein R and R' are aromatic groups, and wherein each carboxy group is vicinal to an acylated amino group with a diprimary diamine of the formula $$H_2N—R'''—NH_2$$

where R''' is an aromatic group, said reaction being conducted at a temperature above about 200° C. for a period of time in the range of from about 0.5 to 100 hours to yield a polyquinazolone consisting of recurring units of the formula

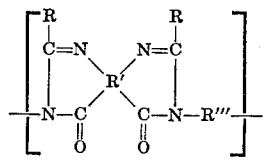

6. The process of claim 5, wherein R is a phenyl group.
7. The process of claim 6, wherein R' is aromatic and is selected from the class consisting of

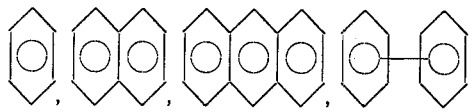

and

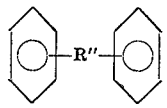

wherein R'' is selected from the class consisting of —CO—, —SO₂—, —O—, —N—, an aliphatic group, and an aromatic group.

8. The process of claim 7, wherein the diprimary diamine is of the formula $$H_2N—R'''—NH_2$$

wherein R''' is selected from the class consisting of

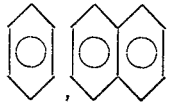

and

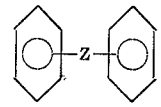

Z being selected from the class consisting of a lower alkyl group having 1 to 5 carbon atoms, oxygen, and a covalent bond.

9. The process of claim 5, wherein the diacylated aromatic diaminodicarboxylic acid is dibenzoyl-bisanthranilic acid and the diprimary diamine is 4,4-diaminodiphenylether.

References Cited

Serlin et al., New Linear Heterocyclic Polymers; Polypyrimidonequinozolones, Journal of Polymer Science, vol. 60, pp. S59–S63, (1962).

WILLIAM H. SHORT, *Primary Examiner.*

L. L. LEE, *Assistant Examiner.*

U.S. Cl. X.R.

260—65, 78 79.3